Dec. 25, 1962   W. R. EVANS ETAL   3,070,712
EXCESS ERROR SIGNAL STORAGE MEANS FOR SERVO SYSTEMS
Filed Dec. 19, 1958   2 Sheets-Sheet 1

INVENTORS.
WALTER R. EVANS
ADRIAN K. DORSMAN
BY John A. Duffy
AGENT

United States Patent Office 3,070,712
Patented Dec. 25, 1962

3,070,712
EXCESS ERROR SIGNAL STORAGE MEANS
FOR SERVO SYSTEMS
Walter R. Evans and Adrian K. Dorsman, Whittier,
Calif., assignors to North American Aviation, Inc.
Filed Dec. 19, 1958, Ser. No. 781,709
5 Claims. (Cl. 307—88.5)

This invention relates to a signal saving device for servo systems and more particularly to a device for saving the excess error signal produced in a servo system subject to transient saturation.

Servo systems commonly include compensation networks such as a lead network for improving the speed of response and stability. While these networks are indispensable to the operation of the system, they give rise to sharp peaks in the forcing function which are many times larger in magnitude compared to the normal value. As a result the controlled servo system is temporarily saturated. The amount of the input signal above the saturation limit of the system is lost. Therefore, the system fails to reach the desired initial speed and responds sluggishly and at times with large overshoots. This effect is highly undesirable in servo systems.

This invention overcomes the above stated errors in feedback control systems due to transient saturation by providing a means for storing any excess input signal above the saturation limit of the system and means for subjecting the system to the stored signal after the input signal falls below the saturation level. A simple and accurate electronic circuit is provided which when inserted in a controlled servo feedback system saves the entire error signal produced in the system.

It is therefore an object of this invention to provide an improved feedback control system.

It is another object of this invention to provide a means for saving the excess error signal in a servo system.

It is still another object of this invention to provide a circuit for improving the operating characteristics of a feedback control system subjected to transient saturation.

It is a further object of this invention to provide means for storing the excess error signal in a servo system.

It is a still further object of this invention to provide means for storing the error signal in a feedback control system which exceeds the saturation level and for applying the stored signal to the system when the level falls below saturation.

Other objects will become apparent from the following description taken in connection with the accompanying drawings in which.

Figure 1:
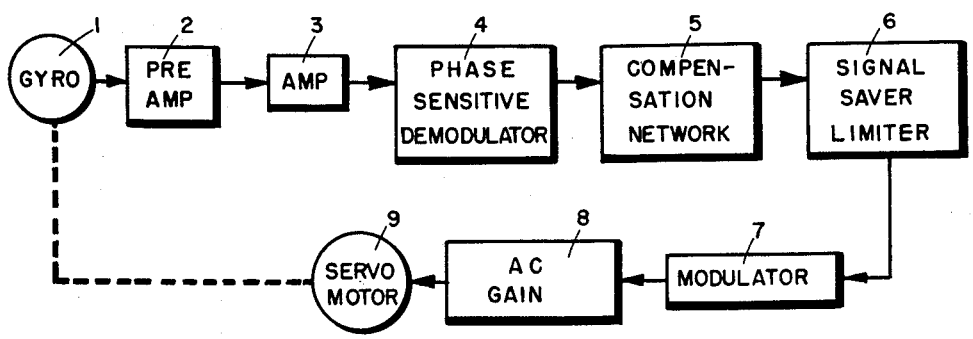
FIG. 1 is a block diagram illustrating the application of the device of this invention to a typical feedback control system.

Referring to FIG. 1, there is shown a block diagram of a typical feedback control system. The unit to be controlled may be for illustration purposes gyroscope 1 which may be placed in a guided missile to sense appropriate movements of the missile. The output of gyroscope 1, which may be a signal proportional to the precession angle about an axis of the gyro, is fed to a preamplifier 2 which amplifies the signal in a manner well known to the servo system art and feeds the signal to amplifier 3 which further amplifies this signal and presents an output to phase sensitive demodulator 4 which removes the carrier signal and feeds an output sinusoidal varying signal into a compensation network 5 which may be any lead, lag, or combination thereof, network well known in the servo art. The output of demodulator 4 is a comparatively large amplitude signal which may be, for example, as high as 40 volts for a typical system. The attenuation of compensator network 5 may be as high as 200 which reduces the output voltage of network 5 to approximately ½₀ of 1 volt. This signal is then fed to signal saver limiter 6 which stores any signal which is in excess of the saturation level of the system until the level falls below the saturation limit, at which time the stored signal is re-introduced into the system, thereby preventing any loss of a signal. The output of signal saver limiter 6 is then fed through modulator 7 and A.-C. gain 8 which present a signal for controlling servo motor 9 in a manner well known in the art. Servo motor 9, in turn, drives gyroscope 1 thereby tending to maintain the system at a null control point at all times. Signal saver limiter 6 is inserted in the feedback control system to receive the output of compensator network 5, then store the excess error signal and finally present the signal to modulator 7 in order to limit the error signal at the desired point. Thus, placing signal saver limiter anywhere else in the system where the voltage levels are relatively high would not be feasible. The function of signal saver limiter 6 is to receive the error signal from compensation network 5, store any excess signal above the saturation limit of the system, and apply the error signal to modulator 7 after the input signal from compensation network 5 falls below the saturation level.

Figure 2:
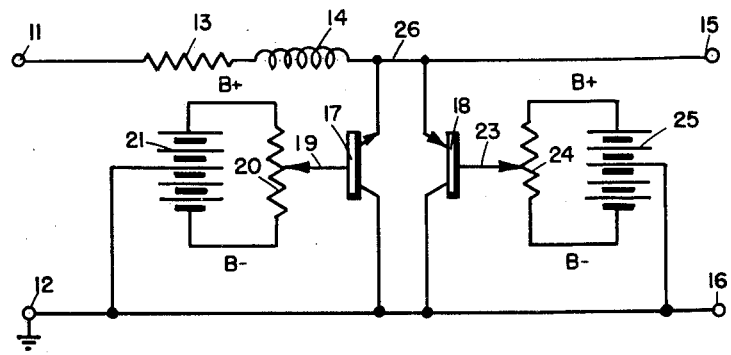
FIG. 2 is a schematic diagram of the signal saver limiter of the invention.

Turning now to FIG. 2, there is shown a schematic diagram of the circuit of the signal saver limiter 6 of FIG. 1. In FIG. 2, input terminals 11 and 12 receive the signal from compensation network 5 of FIG. 1. Terminal 12 is grounded. Input terminal 11 is connected through a resistor 13 to the storage element 14 which may be, for example, an inductance element. Resistor 13 and inductor 14 are in series between input terminal 11 and output terminal 15. Output terminals 15 and 16 provide the input signal to the modulator 7 of FIG. 1. Inductance element 14 may consist, for example, of a toroidal inductor which has the desired hysteresis characteristics and is chosen for more effective design purposes to be nonlinear, i.e., a negligible value of flux for signal levels below the limiting value and a high value of flux for signal levels above the limiting value. The value of resistor 13 will depend on the design characteristics of the entire system of FIG. 1. In particular the ratio of the impedance of resistor 13 to the impedance of the load presented across output terminals 15 and 16 by modulator 7 of FIG. 1 may be from approximately 1 to 3 to 1 to 10 depending on the particular servo system. This value may vary depending upon the design characteristics of the particular servo system being used. Positive and negative half-cycle voltages at the output of inductor 14 are maintained at a constant predetermined limit level, which is the saturation level of the system, by a pair of transistor circuits. NPN transistor 17 with associated circuitry limits the amplitude of the signal for the negative half cycle of operation and PNP transistor 18 limits the amplitude of the signal for the positive half cycle of operation. The base of transistor 17 is connected through wiper 19 to a predetermined point on variable resistor 20. Resistor 20 is connected across a direct-current source 21 which provides the necessary bias level potentials for the base of transistor 17. D.-C. source 21 has a B+ terminal, a ground terminal and a B— terminal as shown. Similarly, the base of transistor 18 is connected through wiper 23 to a predetermined point on variable resistor 24 which in turn is connected across the B+ and B— terminals of D.-C. source 25 as shown. The midpoint of D.-C. source 25 is connected to ground. D.-C. sources 21 and 25 are shown as two separate sources but may be taken from the same source of D.-C. potential. Transistors 17 and 18 are of such a design so as to conduct when the voltage at the emitters reach the predetermined maximum level, for example, .05 volt. The emitters of transistors 17 and 18 are connected to point 26 in common with the output of inductor 14. Transistor 17 is designed to conduct during the negative half cycle of operation when point 26 falls below the negative limit established. The collectors of transistors 17 and 18 are connected to ground to complete the D.-C. circuit. Transistor 18 is designed to conduct during the positive half cycle of operation when the voltage level at point 26 rises above the saturation limit. The voltage differential between the emitter and bases of transistors 17 and 18 must necessarily be very small in order to accommodate the extremely low voltage level at point 26 which is due to the voltage level at the particular position in the feedback control system of FIG. 1 that the signal saver limiter is inserted. Thus for a typical operation the saturation level at point 26 may be, for example, as low as .05 volt. Thus the voltage differential between point 26, the emitter of transistor 18, and the base of transistor 18 is very small. Transistors 17 and 18 conduct when the voltage level of point 26 rises above or falls below the saturation level and function to maintain the voltage level at point 26 within the established limits. Transistors necessary to operate at the low voltage level necessary are well known in the art. The operating characteristics of transistors 17 and 18 are similar and it is desired to maintain them as nearly identical as possible in order to establish correct symmetry of operation.

In operation of the circuit of FIG. 2 taken in conjunction with the block diagram of FIG. 1, assume for example that an alternating-current signal of varying voltage levels is received at terminals 11 and 12 from the compensation network 5 of FIG. 1. As long as the positive and negative half-cycle amplitudes of voltage levels are within the prescribed limits transistors 17 and 18 remain nonconducting presenting an open switch to point 26 and the voltage level across terminals 11 and 12 is transferred to output terminals 15 and 16 at substantially the same value. However, as soon as the limit, either positively or negatively, is reached, then transistor 17 will conduct if the negative limit is exceeded and transistor 18 will conduct if the positive level is exceeded, maintaining point 26 at the established limit level. When the limit is exceeded, the voltage at point 11 exceeds the voltage at point 26 by the amount the voltage at terminal 11 exceeds the limit level. Thus there is a voltage drop across resistor 13 and inductor 14 equal to the excess voltage. Inductor 14 operates to store this excess voltage by having its flux (in both the positive and negative directions) increased proportional to the excess voltage. This increase in flux causes inductor 14 to store the excess voltage. Another way of treating the action is to consider inductor 14 as an integrating device since the increase in flux due to the excess voltage across across the inductor acts to integrate the excess voltage storing flux proportional to the excess voltage. As long as point 26 remains within the prescribed voltage levels, inductor 14 does not affect the circuit. Assume for example, however, that the positive and negative half cycles of operation are exceeding the prescribed limit. Inductor 14 increases in flux thereby storing a signal proportional to the voltage in excess of the limit at point 26. As soon as the signal across terminals 11 and 12 falls below the limit, the flux in inductor 14 decays thereby maintaining the voltage at point 26 at the limit level and thus restoring the excess signal. Thus it can be seen that input signals at terminals 11 and 12 in excess of the prescribed saturation limit level are stored in inductor 14 until such time when the input signals fall below the prescribed level at point 26, at which time the voltage signal is re-inserted in the system thereby operating as a signal saver until the voltage impulse stored in inductor 14 is absorbed.

Figure 3:
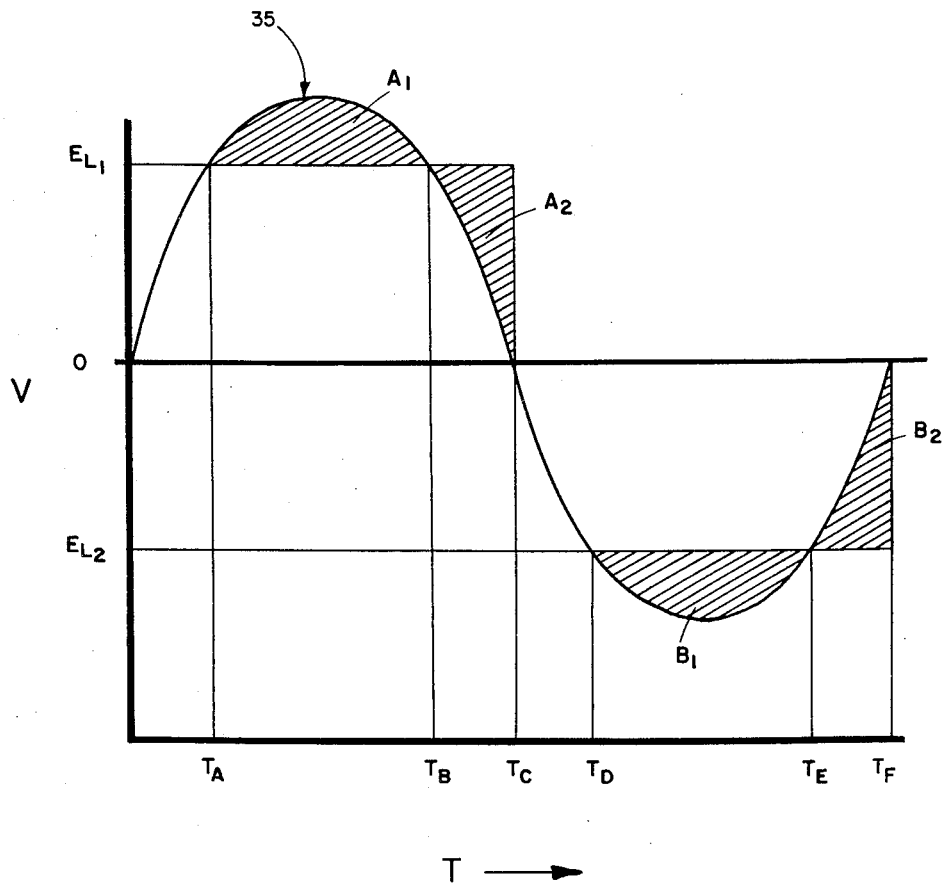
FIG. 3 shows a graph of the input and output characteristics of the signal saver limiter of this invention.

Turning now to FIG. 3, there is shown a graph illustrating the storing functions of the circuit of FIG. 2. In FIG. 3 sine wave 35 represents the signal input across terminals 11 and 12 of FIG. 2. Voltage $E_{L1}$ represents the limit of saturation level during the positive half cycle and $E_{L2}$ represents the limit for negative half cycles. Transistor 17 operates to conduct when the voltage exceeds $E_{L2}$ in the negative direction, and transistor 18 conducts when the voltage exceeds the limit $E_{L1}$ in the positive direction. Thus it can be seen that point 26 of FIG. 2 does not exceed the voltages $E_{L1}$ and $E_{L2}$ during operation. When sine wave 35 reaches point $T_A$ at the upper limit voltage $E_{L1}$ then transistor 18 conducts operating to maintain point 26 at the constant voltage $E_{L1}$ and inductor 14 increases in flux thereby storing the voltage between $T_A$ and $T_B$ during the time sine wave 35 is above the limit $E_{L1}$. This storage corresponds to area A1 in FIG. 3. At the time $T_B$, the voltage level of sine wave 35 starts to fall below $E_{L1}$. The signal stored in inductor 14 now operates to maintain the voltage at $E_{L1}$ until time $T_C$, at which time the flux stored in inductor 14 dissipates and the voltage drops to return to the normal sine wave configuration. Thus it can be seen that area A2 represents the voltage impulse released by inductor 14 after the voltage level falls below $E_{L1}$. Areas A1 and A2 are approximately equal thereby realizing the desired design characteristics of saving the entire excess error signal above $E_{L1}$. Similarly during the negative half cycle of operation transistor 17 conducts commencing at time $T_D$ when the voltage $E_{L2}$ is reached by the negative half cycle of sine wave 35. From time $T_D$ to $T_E$ the excess voltage is stored in inductor 14 designated by area B1 in FIG. 3. At time $T_E$ when the voltage starts to rise above the negative limit then inductor 14 commences to release the stored signal thereby maintaining the voltage at $E_{L2}$ between times $T_E$ and $T_F$ until the entire stored signal is released at which time the voltage again returns to the normal sine wave. Thus area B2 represents the signal restored to the circuit and is approximately equal to area B1. The restored areas A2 and B2, which are approximately equal to the clipped signal areas A1 and B1, insure that the signal saver of FIG. 2 which accepts input signal at terminals 11 and 12 presents over a period of time signals at terminals 15 and 16 which include the voltage impulse in the signals in excess of the saturation level.

With the signal saver limiter 6 inserted in the circuit of FIG. 1 the range of acceptable system performance in a feedback control system can be extended far beyond the range heretofore realized in servo systems in cases where saturation is of short duration compared to servo response time. The components used in the signal saver limiter 6 are simple and highly accurate with transistors 17 and 18 insuring the operability of this system at the extremely low voltage levels necessary in the servo system.

The circuit of FIG. 2 has wide application and is particularly desirable in any feedback control system which evidences transient stauration to any degree. The improvements in performance of a feedback control system having a signal saver limiter as described are substantial and without exception. Increased system response and signal stability add to the advantages of the circuit described.

Although this invention has been described and illustrated in detail, it is to be clearly understood that the same is by way of illustration and example only and is not to be taken by way of limitation, the spirit and scope of this invention being limited only by the terms of the appended claims.

We claim:

1. Means for saving the feedback control error signal in a servo system comprising means for receiving said error signal, means for generating a first unipolar limiting signal whose amplitude is indicative of the saturation level of said servo system for the positive half cycle of operation, first transistor switch means responsive to the difference between the magnitude of said error signal and said first limiting signal for positive half cycles of operation for limiting the magnitude of the positive half cycle of said error signal to the magnitude of said first limiting signal, means for generating a second unipolar limiting signal, second transistor switch means responsive to the difference between the magnitude of said error signal and said second limiting signal for negative half cycles of operation for limiting the magnitude of the negative half cycles of said error signal to the magnitude of said second limiting signal, and means responsive to said first and second transistors switch means for storing the difference between the magnitude of said error signal and said first and second limiting signals.

2. The combination recited in claim 1 wherein said storing means comprises an inductor.

3. The combination recited in claim 1 wherein said first and second switching means comprise a pair of opposite type transistors, each said transistor having a control electrode and a pair of output electrodes, said output electrodes connected across said error signal and said control electrodes being responsive to said limiting signal.

4. In a servo system having a closed loop control path, means for generating positive and negative half cycle limiting signals having an amplitude corresponding to the saturation level of said servo system, positive and negative half cycle transistor switch means responsive to the difference between the magnitude of said error signal and said limiting signals for limiting the magnitude of said error signals to the magnitude of said limiting signals, each said limiting signal generating means being connected to bias an associated one of said transistor switch means, said switch means being connected in shunt with said control path, and inductor means interposed in said control path responsive to said switch means for storing said difference in magnitude between said error signals and said limiting signals.

5. In combination with a servo system having a closed loop control path and a compensation network therein for improving speed of response and stability of said servo system whereby transient saturation of the system may occur due to action of said network, signal saving means responsive to the output of said network and interposed in said control path for compensating such saturation by temporarily storing control signals above saturation level and subsequently inserting such signals into the control path; said signal saving means comprising: a pair of oppositely poled and similarly biased limiting transistors coupled to shunt the output of said compensation network and an inductor series connected between the output of said compensation network and one terminal of each of said transistors.

References Cited in the file of this patent
UNITED STATES PATENTS

| | | |
|---|---|---|
| 2,731,571 | Chance | Jan. 17, 1956 |
| 2,829,282 | Hughes et al. | Apr. 1, 1958 |
| 2,860,260 | Sykes | Nov. 11, 1958 |
| 2,864,961 | Lohman et al. | Dec. 16, 1958 |
| 2,873,367 | Zawels | Feb. 10, 1959 |
| 2,935,625 | Schayes | May 3, 1960 |